United States Patent
Ambrož et al.

[11] Patent Number: 5,960,935
[45] Date of Patent: Oct. 5, 1999

[54] CURING PRESS CHUTE

[75] Inventors: Jaroslav Ambrož; Milan Koutsky, both of Plzeň, Czech Rep.

[73] Assignee: SKODATS s.r.o., Czech Rep.

[21] Appl. No.: 09/159,542

[22] Filed: Sep. 24, 1998

[30] Foreign Application Priority Data

Sep. 24, 1997 [CZ] Czech Rep. ............................ 3007-97

[51] Int. Cl.[6] .................................................. B65G 17/34
[52] U.S. Cl. ........................................ 198/801; 198/477.1
[58] Field of Search ............................ 198/468.8, 476.1, 198/477.1, 801, 802

[56] References Cited

U.S. PATENT DOCUMENTS

| | | | |
|---|---|---|---|
| 214,233 | 4/1879 | Bates | 198/477.1 |
| 3,664,482 | 5/1972 | Kornylak | 198/476.1 X |
| 4,013,186 | 3/1977 | Barton et al. | 214/660 |
| 4,338,069 | 7/1982 | Singh et al. | 425/38 |
| 4,385,701 | 5/1983 | Buckminster et al. | 198/801 X |
| 4,770,286 | 9/1988 | Opperthauser | 198/476.1 |

FOREIGN PATENT DOCUMENTS 2206091  12/1988  United Kingdom ................ 198/477.1

*Primary Examiner*—James R. Bidwell
*Attorney, Agent, or Firm*—Burns, Doane, Swecker & Mathis, L.L.P.

[57] ABSTRACT

A height adjustable chute is provided for transporting finished tires away from a curing press mold. The chute includes a vertical guideway having a height-adjustable carrier movable on the guideway to adjust a height of the chute. The height adjustability of the chute allows the shock caused by the weight of a tire removed from the mold to be minimized. A tipping arrangement of the chute provides a smooth transport of the finished tire from the curing press area without the need for operator intervention.

7 Claims, 1 Drawing Sheet

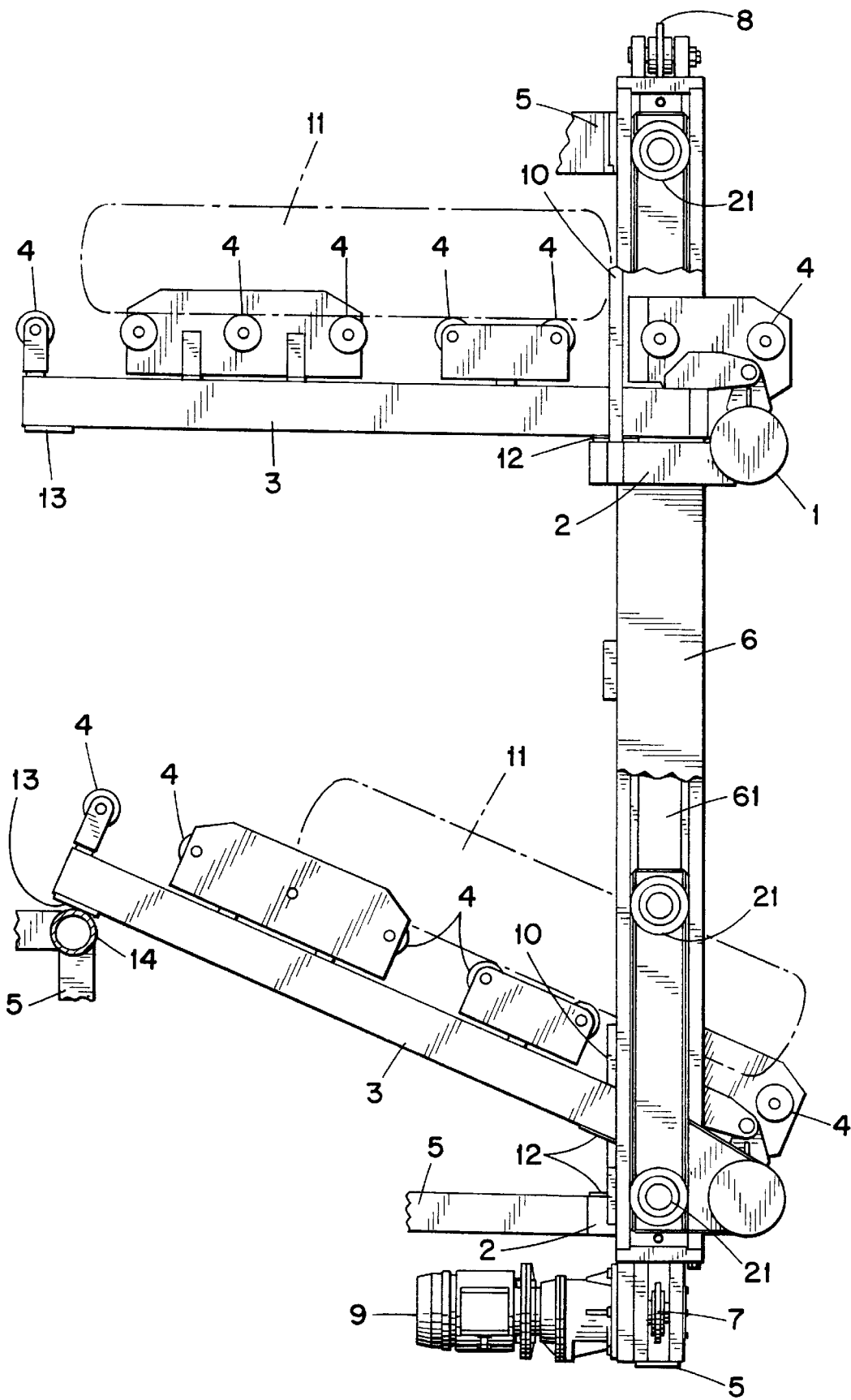

CURING PRESS CHUTE

BACKGROUND OF THE INVENTION

1. Field of the Invention

The invention involves a curing press chute that serves to withdraw finished tires after their removal from a curing press mold.

2. Brief Description of the Related Art

The existing curing press chutes are the part of the equipment for withdrawal of finished tires from a curing press mold. The use of tire removal chutes makes the operator's work considerably easier in comparison with previously used handling equipment that served for both loading of green tires into the curing press mold and unloading tires from the mold. The removal of finished tires was dangerous and physically demanding work for the operators. Contributing to poor work safety is the fact that the manipulation of the finished tire ran along in front of the press. In fact, they were the manually operated manipulators. These devices have been replaced by devices, using chutes for removal of tires. In the existing withdrawing devices, the finished tire is lifted over the bladder upper ring of the mold and gradually put down onto the roller chute behind the press. For the manipulation of the finished tire, the chute runs behind the press out of the way of the operator, improving the work safety. However, adjustment of the withdrawing equipment is rather demanding and often requires intervention of an operator. Improper adjustment, can cause damage to the mold such as a thrown piston rod of the main bladder ring. In addition, the chute is positioned at a constant height and can cause damage to occur due to release of the finished tire from a greater height than desired due to improper adjustment.

SUMMARY OF THE INVENTION

The curing press chute according to this invention eliminates the mentioned deficiencies of the existing chute designs by providing a height adjustable chute. The chute includes a vertical guideway connected with a frame. Arranged on the vertical guideway is a height-adjustable carrier into which is joined, by means of a hinge, a chute frame. A dog protrudes from the carrier or from the chute frame which contacts, against the other of the chute frame or carrier to limit rotary movement of the chute frame at an upper position of the chute frame. The chute frame is provided with a contact surface and the frame with a stop to limit rotary movement of the chute frame at a lower position. The height adjustability of such a chute design allows the shock caused by the tire weight when the tire is released from the withdrawing device to be minimized. The tipping arrangement of the system, limited by the dog and stop, will secure a smooth transport of the finished tire from the curing press area without any operator intervention.

For transport of the finished tire along the chute, and minimalization of resistance, the chute is provided with a system of rollers. A blocking plate, connected with the carrier, passes through the chute frame and prevents the tire from moving off of the chute until it reaches a lower position.

BRIEF DESCRIPTION OF THE DRAWING

The attached drawing is a side view of the chute frame on the vertical guideway, shown with the chute frame in two positions.

DETAILED DESCRIPTION OF THE PREFERRED EMBODIMENT

A vertical guideway 6 of the curing press chute is firmly attached to a frame 5. A height-adjustable carrier 2 is arranged on the vertical guideway 6 and is provided with rollers 21. The vertical guideway 6 is provided with a path 61 corresponding to the rollers 21 of the carrier 2 to allow the carrier to move up and down on the guideway. A chute frame 3 is connected to the carrier 2 by a hinge 1. An upper side of the chute frame 3 is provided with a system of rollers 4 for receiving and transporting a tire. From the carrier 2 and/or the chute frame 3, there protrudes a dog 12 which provides a stop against rotation of the chute frame 3 past a horizontal position as shown in the top of the figure. On a free end of the chute frame 3, there is, a contact surface 13 that abuts against stop 14 on the frame 5. The vertical motion of the carrier 2 along the vertical guideway 6 is provided by an electric motor 9 whose chain pulley 7 drives an unillustrated chain connected with the carrier 2. On the upper end of the vertical guideway 6 the chain wraps around and returns via a return pulley 8. The carrier 2 is also provided with a blocking plate 10 that extends from the carrier through the frame 3. The blocking plate 10 prevents the tire 11 from sliding off of the chute frame 3 at the upper position or as the chute frame is lowered by the motor 9 to the lower position.

After completion of the curing process, the finished tire 11 is removed from the mold by means of withdrawing equipment (not shown). Simultaneous the chute frame 3 is raised to the upper position by action of the electric motor 9. In this upper position, the dog 12 of the chute frame 3 or carrier 2 bears against other of the chute frame or carrier, and the blocking plate 10 protrudes above the system of rollers 4. Hereby, the blocking plate 10 circumscribes the position of placement of the tire 11 by the withdrawing equipment. The shock from a weight of the tire 11 during placement of the tire on the rollers 4 is minimal due to the positioning of the chute frame 3 at the upper position close to the withdrawing equipment. Subsequently, by action of the electric motor 9, the tilting chute frame 3 with the tire 11 moves to the lower position seating the contact surface 13 on the stop 14, which results in moving the carrier 2 away from the chute frame 3 and slightly rotating the chute frame around the hinge 1. At the same time, the amount that the blocking plate 10 extends above the rollers 4 is reduced until the tire 11 no longer leans against the blocking plate. The tire 11 then passes over the rollers 4 and the upper edge of the blocking plate 10 and spontaneously runs down from the rollers 4 for the next manipulation of the tire out of the reach of the curing press.

We claim:

1. A curing press chute for removing tires from a curing press, the curing press chute comprising:

a vertical guideway connected to a frame;

a carrier movable on the vertical guideway to adjust a height of the curing press chute;

a chute frame attached to the carrier by a hinge;

a stop on the frame for contacting the chute frame when the chute frame is lowered from an upper positioned to a lower position to tilt the chute frame allowing the tire to pass off of the chute frame; and wherein the carrier includes a blocking plate which extends through the chute frame and prevents a tire from passing off of the chute frame until the chute frame reaches a predetermined lower position.

2. The curing press chute of claim 1, further comprising a plurality of rollers provided on the chute frame for transporting the tires.

3. The curring press chute of claim 1, wherein the chute frame or the carrier includes a dog for limiting rotation of the chute frame at an upper position of the chute frame.

4. The curring press chute of claim 1, wherein the carrier is movable on the vertical guideway by a motor.

5. The curring press chute of claim 1, wherein the carrier moves vertically on the vertical guideway by rollers which travel in a track on the vertical guideway.

6. The curing press chute of claim 1, wherein the frame is a frame of a curing press mold.

7. A curing press chute for removing tires from a curing press, the curing press chute comprising:

a vertical guideway;

a tire chute vertically movable on the vertical guideway between an upper tire receiving position and a lower tire removing position, wherein the tire chute is substantially horizontal in the upper position and is pivoted to an angle at the lower position;

a motor for moving the tire chute between the upper and lower positions;

a hinge connecting the tire chute to a carrier which is movably mounted on the vertical guideway; and a blocking plate which prevents a tire from passing off the chute in the upper position and allows the tire to pass off of the tire chute in the lower position.

* * * * *